(12) United States Patent
Zhao

(10) Patent No.: US 8,791,914 B2
(45) Date of Patent: Jul. 29, 2014

(54) INPUT METHOD APPLIED IN ELECTRONIC DEVICES

(75) Inventor: Rui Zhao, Shanghai (TW)

(73) Assignees: Inventec Appliances (Shanghai) Co., Shanghai (CN); Inventec Appliances Corp., New Taipei (TW); Inventec Appliances Corp., Shanghai, Shanghai (CN)

( * ) Notice: Subject to any disclaimer, the term of this patent is extended or adjusted under 35 U.S.C. 154(b) by 343 days.

(21) Appl. No.: 13/369,041

(22) Filed: Feb. 8, 2012

(65) Prior Publication Data

US 2012/0200492 A1  Aug. 9, 2012

(30) Foreign Application Priority Data

Feb. 9, 2011  (CN) .......................... 2011 1 0035078

(51) Int. Cl.
*G06F 3/041* (2006.01)
*G06K 9/00* (2006.01)
*G06F 3/03* (2006.01)
*G06F 3/01* (2006.01)

(52) U.S. Cl.
CPC .......... *G06F 3/0304* (2013.01); *G06K 9/00375* (2013.01); *G06K 9/00892* (2013.01); *G06K 9/00315* (2013.01); *G06F 3/011* (2013.01)

USPC .......................................... 345/173; 345/179

(58) Field of Classification Search
CPC combination set(s) only.
See application file for complete search history.

(56) References Cited

U.S. PATENT DOCUMENTS

| | | | |
|---|---|---|---|
| 6,313,864 B1 * | 11/2001 | Tabata et al. | 348/14.02 |
| 6,504,944 B2 * | 1/2003 | Mihara et al. | 382/118 |
| 6,690,815 B2 * | 2/2004 | Mihara et al. | 382/118 |
| 6,964,023 B2 * | 11/2005 | Maes et al. | 715/811 |

* cited by examiner

*Primary Examiner* — Van Chow
(74) *Attorney, Agent, or Firm* — Wang Law Firm, Inc.; Li K. Wang; Stephen Hsu

(57) ABSTRACT

An input method applicable for inputting into an electronic device, which includes the steps of capturing a lip motion of a person; receiving an image of the lip motion; encoding the lip motion image to obtain a lip motion code; comparing the lip motion code with a plurality of standard lip motion codes to obtain a first text result matching the lip motion code; and displaying the first text result on the electronic device if the first text result is obtained. If the first text result is not obtained, the method may further include activating an auxiliary analyzing mode for the electronic device for recognizing a facial expression, a hand gesture, or an audio signal to be inputted. The input method can diversify input methods for the electronic device.

12 Claims, 11 Drawing Sheets

_US 8,791,914 B2_

INPUT METHOD APPLIED IN ELECTRONIC DEVICES

CROSS-REFERENCE TO RELATED APPLICATION

This application claims the benefit of priority to China Patent Application No. 20110035078.3, filed on Feb. 9, 2011, in the State Intellectual Property Office of the People's Republic of China, the disclosure of which is incorporated herein in its entirety by reference.

BACKGROUND OF THE INVENTION

1. Field of the Invention

The present invention relates to an input method applied in electronic devices, in particular to the input method primarily using a lip motion image to recognize text information.

2. Description of the Related Art

At early stage, information communication technology was not well developed, and the research and development of various electronic information products aim at promoting the circulation of information without being limited by time and space. In recent years, the electronic information technologies advance, and people pay more attention on recreations and emphasize on the convenience of our life, so that the electronic information products tend to be developed toward user-friendly and diversified designs.

The first priority object to make each electronic communication product user-friendly is to improve the convenience of interactions between users and the electronic information product; namely, the users can interact with the electronic information product with more diversified ways instead of being limited to any specific way. Therefore, the audio input method, in addition to the handwriting input method, is gradually used in various electronic information products in the earliest stage. For example, the client with conventional mobile phones may input through the audio input function to substitute the conventional handwriting input mode for inputting short messages to mobile phones to overcome the flaw of time-consuming in the conventional handwriting input method. The audio input method is also used for replacing the conventional remote control to control the switch between TV channels.

Although the audio input method improves the flaw of time consumption in the traditional handwriting input method, yet the audio input method or handwriting input method is still insufficient for applications in some cases. For example, when electronic products are used for games or related recreational functions, a single input method will limit the fun of the games. Even though the audio input method is convenient enough for most users, some users with inconveniences in speech, such as intubated patients, dumb persons, or audio-disorder patients will be unable to solve the inconveniences that they faced.

To make various electronic communication products to extensively fit and satisfy different kinds of users, it is inevitable to develop a variety of information input method.

SUMMARY OF THE INVENTION

To overcome the aforementioned problems of the prior art, it is an objective of the present invention to provide an input method applicable for inputting (e.g. information) into an electronic device, for diversifying input methods for the electronic device.

To achieve the foregoing objective, the present invention provides an input method applicable for inputting into an electronic device. The electronic device has an image capturing unit, a processing module, a lip motion code database, a lip-reading analyzing unit, and a display module. The input method of the present invention comprises the steps of: capturing a lip motion of a person through the image capturing unit; receiving an image of the lip motion from the image capturing unit; encoding the lip motion image through the lip-reading analyzing unit to obtain a lip motion code; the processing module comparing the lip motion code with a plurality of standard lip motion codes stored in the lip motion code database to obtain a first text result matching the lip motion code; and displaying the first text result through the display module if the first text result is obtained.

In an embodiment, the lip motion code database is configured to store the obtained lip motion code, which represents the recognized lip motion (image), as a standard lip motion code for recognizing another inputted lip motion (image) by this method at the next time.

In an embodiment, the lip motion code comprises a coordinate value of each lip motion characteristic point in the lip motion image, the coordinate value being in a Cartesian coordinate system and calculated by the lip-reading analyzing unit.

In an embodiment, if the first text result is not obtained, the input method further comprises activating an auxiliary analyzing mode.

In an embodiment, the electronic device further comprises a facial expression analyzing unit and a facial expression code database and the auxiliary analyzing mode is a facial expression analyzing mode. The input method further comprises the following steps: capturing a facial expression of the person through the image capturing unit; receiving an image of the facial expression from the image capturing unit; encoding the facial expression image through the facial expression analyzing unit to obtain a facial expression code; the processing module comparing the facial expression code with a plurality of standard facial expression codes stored in the facial expression code database, and comparing the lip motion code with the plurality of standard lip motion codes, to obtain a second text result matching the facial expression code and the lip motion code; and displaying the second text result through the display module if the second text result is obtained. And the facial expression code database may be configured to store the obtained facial expression code, which represents the recognized facial expression (image), as a standard facial expression code for recognizing another inputted facial expression (image) by this facial expression analyzing mode at the next time.

In an embodiment, the electronic device further comprises a hand gesture analyzing unit and a hand gesture code database, and the auxiliary analyzing mode is a hand gesture analyzing mode. The input method further comprises the following steps: capturing a hand gesture of the person by the image capturing unit; receiving an image of the hand gesture from the image capturing unit; encoding the hand gesture image through the hand gesture analyzing unit to obtain a hand gesture code; the processing module comparing the hand gesture code with a plurality of standard hand gesture codes stored in the hand gesture code database, and comparing the lip motion code with the plurality of standard lip motion codes, to obtain a third text result matching the hand gesture code and the lip motion code; and displaying the third text result through the display module if the third text result is obtained. And the hand gesture code database may be configured to store the obtained hand gesture code, which represents the recognized hand gesture (image), as a standard hand gesture code for recognizing another inputted hand gesture (image) by this hand gesture analyzing mode at the next time.

In an embodiment, the electronic device further includes an audio analyzing unit, an audio input unit, and an audio code database, and the auxiliary analyzing mode is an audio analyzing mode. The input method further comprises the following steps: receiving an audio signal from the audio input unit, the audio signal being input by the person into the audio input unit; encoding the received audio signal through the audio analyzing unit to obtain an audio code; the processing module comparing the audio code with a plurality of standard audio codes stored in the audio code database, and comparing the lip motion code with the plurality of standard lip motion codes, to obtain a fourth text result matching the audio code and the lip motion code; and displaying the fourth text result through the display module if the fourth text result is obtained. And the audio code database may be configured to store the obtained audio code, which represents the recognized audio signal, as a standard audio code for recognizing another inputted audio signal by this audio analyzing mode at the next time.

In an embodiment, the lip motion code database is configured to store a plurality of standard lip motion codes for languages of different countries, and provides for setting one of the languages as a default language to be used on the electronic device.

According to the above description, the input method of the present invention applied in the electronic device has one or more of the following advantages:

(1) In the input method of the present invention, the user's lip motion image, facial expression image, hand gesture image or audio message/signal can be input to achieve the objective of inputting text information into an electronic information device to improve the convenience of inputting text information.

(2) In the input method of the present invention, an automatic learning mechanism is provided, so that the user's electronic device can use the input method to memorize the user's lip motion image, facial expression image, hand gesture image and audio message/signal in a way similar to a memory pillow. When the user inputs information, the input becomes increasingly more convenient with time and the cumulative number of inputs.

(3) In the input method of the present invention, the user's lip motion image, facial expression image, hand gesture image or audio message/signal can be input to achieve the objective of inputting text information into an electronic information device, so that this method can be applied to games to provide more fun to the games.

DETAILED DESCRIPTION OF THE PREFERRED EMBODIMENTS

The technical content of the present invention will be understood after reading the following detailed description of embodiments of the invention with reference to the accompanying drawings for illustration.

Figure 1:
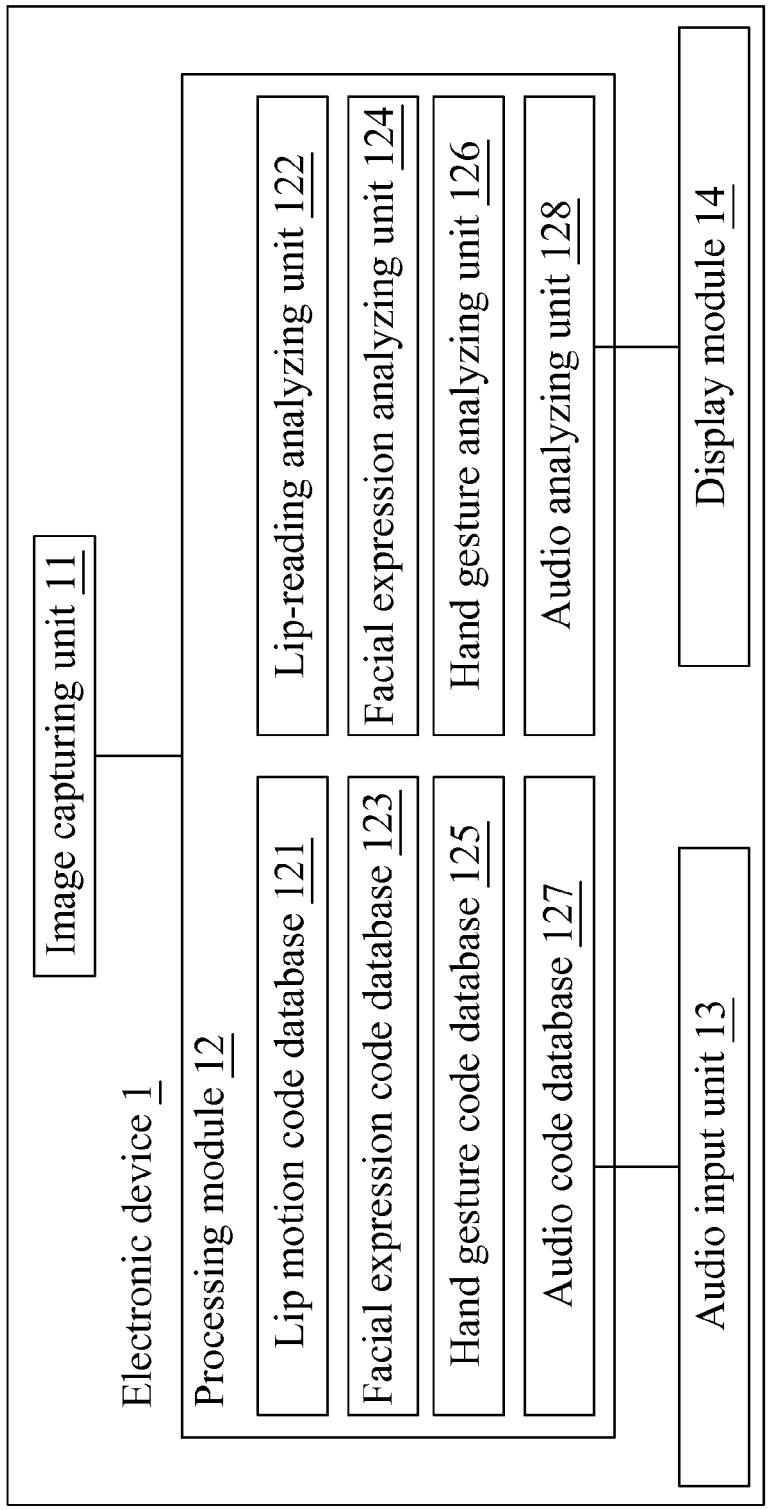
FIG. 1 is a block diagram of an electronic device for use in a preferred embodiment of the present invention.

With reference to FIG. 1 for a block diagram of an electronic device for use in a preferred embodiment of the present invention, the electronic device 1 comprises an image capturing unit 11, a processing module 12, an audio input unit 3 and a display module 14. It's noted that the terms "unit" and "module" means any device or collection of components that is designed to be installed and removed from the electronic device 1. The processing module 12 further comprises a lip motion code database 121, a lip-reading analyzing unit 122, a facial expression code database 123, a facial expression analyzing unit 124, a hand gesture code database 125, a hand gesture analyzing unit 126, an audio code database 127, and an audio analyzing unit 128. The term "electronic device" broadly means any electronic device suitable for use in the present invention. The range of the electronic device encompasses e.g. an input device, a part or place in a larger device where an input action happens, or any electronic device with an input mechanism, such as a digital camera, a computer, or a mobile phone or tablet device.

The image capturing unit 11 is provided for capturing an image of user's lip motion. The processing module 12 receives the lip motion image and recognizes and analyzes the lip motion image to obtain a text result corresponding to the user's lip motion image to solve the problem of inputting text in a conventional handwriting input method. In addition, the image capturing unit 11 can be used to capture a user's facial expression image or hand gesture image, as a mechanism to supplement, and overcome the insufficiency of, the lip motion input method, or an audio input unit 13 is provided for the user to input an audio message/signal, as a mechanism to assist in the lip motion input method.

In an embodiment, the lip motion code database 121 is provided for storing a plurality of standard lip motion codes, and each standard lip motion code has its own corresponding text. The lip motion code database 121 is configured to store the obtained lip motion code, which represents the recognized lip motion (image), as a standard lip motion code for recognizing another inputted lip motion (image) by this method at the next time. The lip-reading analyzing unit 122 is provided for encoding the lip motion image through the processing module to obtain a lip motion code. The processing module 12 further compares the lip motion code with a plurality of standard lip motion codes to obtain a first text result matching the lip motion code. In addition, the lip motion code database 121 is provided for storing a plurality of standard lip motion codes of languages of different countries, and the user can set one of the languages as a default language of the electronic device. When the processing module 12 compares the lip motion code, the processing module 12 performs the comparison with the plurality of standard lip motion codes of the corresponding default language. If the processing module 12 compares and determines that the lip motion code does not belong to the default language, the lip motion code will be compared with a plurality of standard lip motion codes corresponding to one of the other national languages.

The facial expression code database 123 is provided for storing a plurality of standard facial expression codes, and each standard facial expression code has its own corresponding text. The facial expression code database 123 may be configured to store the obtained facial expression code, which represents the recognized facial expression (image), as a standard facial expression code for recognizing another inputted facial expression (image) by this facial expression analyzing mode at the next time. The facial expression analyzing unit 124 is provided for encoding the facial expression image to obtain a facial expression code through the processing module 12. The processing module 12 further compares the facial expression code with a plurality of standard facial expression codes, and compares the lip motion code with a plurality of standard lip motion codes to obtain a second text result matching the facial expression code and the lip motion code.

In addition, the hand gesture code database 125 is provided for storing a plurality of standard hand gesture codes, and each standard hand gesture code has its own corresponding text. The hand gesture code database 125 may be configured to store the obtained hand gesture code, which represents the recognized hand gesture (image), as a standard hand gesture code for recognizing another inputted hand gesture (image) by this hand gesture analyzing mode at the next time. The hand gesture analyzing unit 126 is provided for encoding the hand gesture image to obtain a hand gesture code through the processing module 12. The processing module 12 further compares the hand gesture code with a plurality of standard hand gesture codes, and compares the lip motion code with a plurality of standard lip motion codes to obtain a third text result matching the hand gesture code and the lip motion code.

The audio code database 127 is provided for storing a plurality of standard audio codes, and each standard audio code has its own corresponding text. The audio code database 127 may be configured to store the obtained audio code, which represents the recognized audio signal, as a standard audio code for recognizing another inputted audio signal by this audio analyzing mode at the next time. The audio analyzing unit 128 encodes the audio message/signal to obtain an audio code through the processing module 12. Finally, the processing module 12 compares the audio code with a plurality of standard audio codes, and compares the lip motion code with the plurality of standard lip motion codes to obtain a fourth text result matching the audio code and the lip motion code.

In addition, the electronic device of the present invention provides an automatic learning mechanism. The automatic learning mechanism is that the lip motion code, which is produced by analyzing each of the input lip motion image, and its corresponding text result are stored into the lip motion code database 121 as a reference for analyzing the lip motion by the processing module 12 at the next time. If a lip motion image is input for several times, and the lip motion code and its corresponding text result are the same, the lip motion code will replace the standard lip motion code corresponding to the text in the lip motion code database to become a new standard lip motion code for the text.

Besides the process of inputting the lip motion image, the automatic learning mechanism is also provided in the facial expression code database 123, the hand gesture code database 125 and the audio code database 127, and used as a reference for analyzing a facial expression image, a hand gesture image or a audio message/signal at the next time by the processing module 12.

In addition, the method for the lip-reading analyzing unit 122 to analyze the lip motion image is to take the leftmost end point a, the rightmost end point b, and both top end points c1 and c2 and the bottom end point d of the received lip motion image, and then analyze a corresponding coordinate value of each end point defined on a Cartesian coordinate axis, and encode the lip motion image with the corresponding coordinate value of each end point, to obtain a lip motion code. The coordinate value of each lip motion characteristic point in the lip motion image may be in a Cartesian coordinate system (also called the "rectangular coordinate system") and calculated by the lip-reading analyzing unit. A Cartesian coordinate system may be in two or three dimensions/planes.

Figure 2:
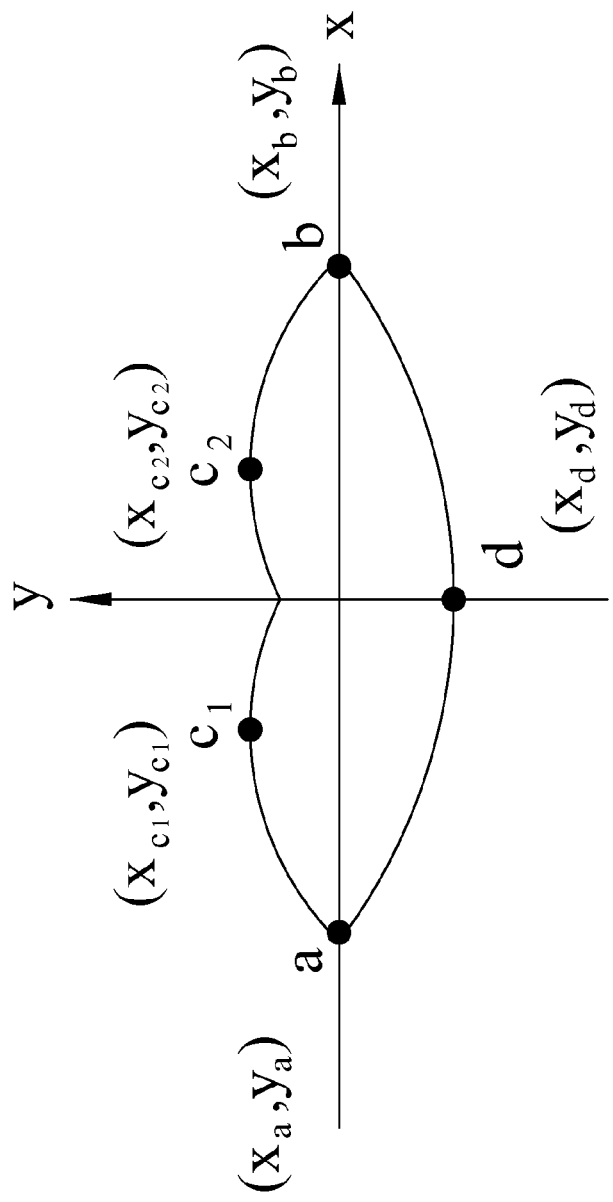
FIG. 2 shows an analysis of coordinate values of a lip motion image in an embodiment of the present invention.

With reference to FIG. 2 showing an analysis of coordinate values of a lip motion image in an embodiment of the present invention, the leftmost end point a, the rightmost end point b, the top end points c1 and c2 and the bottom end point d are situated at a corresponding position of a lip motion image. Each end point on the Cartesian coordinate axis defined by the lip-reading analyzing unit 122 has its own corresponding coordinate value. Preferably, a corresponding coordinate value of the end point a is a first end point coordinate value $(x_a, y_a)$, a corresponding coordinate value of the end point b is a second end point coordinate value $(x_b, y_b)$, a corresponding coordinate value of the end point c1 is a third end point coordinate value $(x_{c1}, y_{c1})$, a corresponding coordinate value of the end point c2 is a fourth end point coordinate value $(x_{c2}, y_{c2})$ and an end point d corresponding coordinate value is a fifth end point coordinate value $(x_d, y_d)$. In addition, the plurality of standard lip motion codes stored in the lip motion code database 121 corresponding to texts are obtained and stored by performing aforementioned coordinate analysis in advance on the lip motion image corresponding to each of the texts, to provide the processing module 12 for recognizing and comparing with the texts matching the lip motion code obtained by the lip-reading analyzing unit 122.

The way for the facial expression analyzing unit 124 to analyze the received facial expression image and a Cartesian coordinate defined by the facial expression analyzing unit 124 is divided into four areas including a first area E, a second area F, a third area G and a fourth area H. Each facial characteristic in each area is analyzed to obtain a corresponding coordinate value of each facial characteristic point on the Cartesian coordinate system defined by the facial expression analyzing unit 124. The facial image is encoded with each coordinate value to obtain a facial expression code, and each facial characteristic refers to e.g. the shape of an eye or a line of two cheeks, etc.

Figure 3:
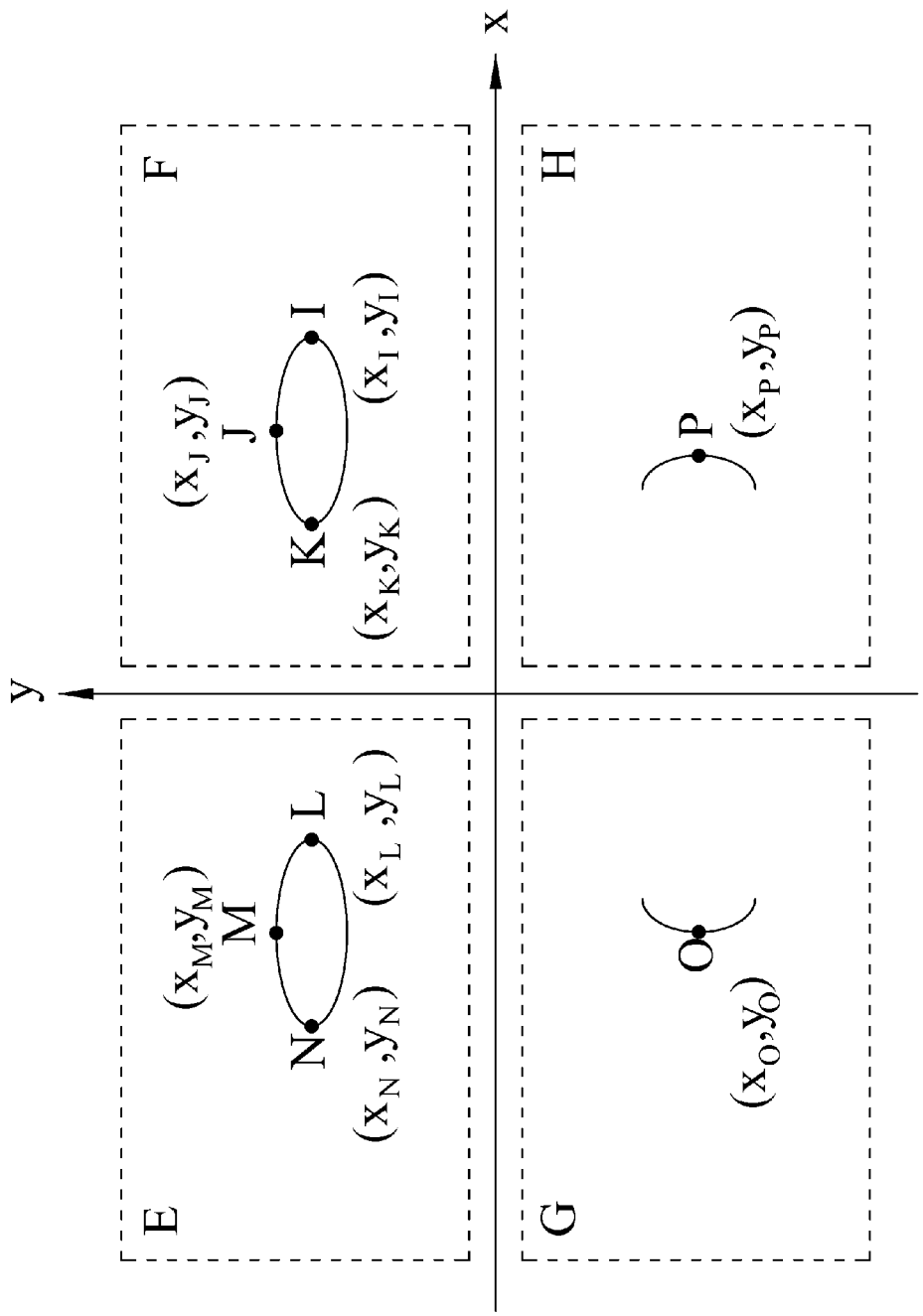
FIG. 3 shows an analysis of coordinate values of a facial expression image in an embodiment of the present invention.

With reference to FIG. 3 showing an analysis of coordinate values of a facial expression image in an embodiment of the present invention, the Cartesian coordinate of a facial expression defined by the facial expression analyzing unit 124 is divided into a first area E, a second area F, a third area G and a fourth area H. An eye expression characteristic exists in the first area E, and the eye expression characteristic is divided into a plurality of eye expression characteristic points L, M and N, and analyzed to obtain corresponding coordinate values $(x_L, y_L)$, $(x_M, y_M)$ and $(x_N, y_N)$ of each eye expression characteristic point L, M and N defined on the Cartesian coordinate system. Similarly, the eye expression characteristic in the second area F is divided into a plurality of eye facial expression characteristic point I, J and K, and analyzed to obtain corresponding coordinate value $(x_I, y_I)$, $(x_J, y_J)$ and ($x_K$, $y_K$) of each eye facial expression characteristic point I, J and K defined on the Cartesian coordinates.

The facial expression characteristic lines of two cheeks exist in the third area G and fourth area H. A facial expression characteristic point O of one cheek is defined on a facial expression characteristic line of the cheek existed in the third area G and a facial expression characteristic point P of another cheek is defined on a facial expression characteristic line of the other check existed in the fourth area H. The facial expression characteristic points are analyzed to obtain corresponding coordinate values ($X_O$, $Y_O$) and ($X_P$, $Y_P$) of the facial expression characteristic points O and P of the cheeks defined on the Cartesian coordinates.

Finally, the facial expression analyzing unit 124 will encode the facial expression image with the obtained coordinate values ($X_I$, $Y_I$), ($X_J$, $Y_J$), ($X_K$, $Y_K$), ($X_L$, $Y_L$), ($X_M$, $Y_M$), ($X_N$, $Y_N$), ($X_O$, $Y_O$) and ($X_P$, $Y_P$) of the facial expression characteristic points to obtain a facial expression code. Similarly, a plurality of standard facial expression codes stored in the facial expression code database 123 are also obtained and stored by performing the aforementioned coordinate analysis in advance on the facial expression image corresponding to various implications, to provide the processing module 12 for recognizing and comparing with text results matching the facial expression code obtained by the facial expression analyzing unit 124.

Figure 4:
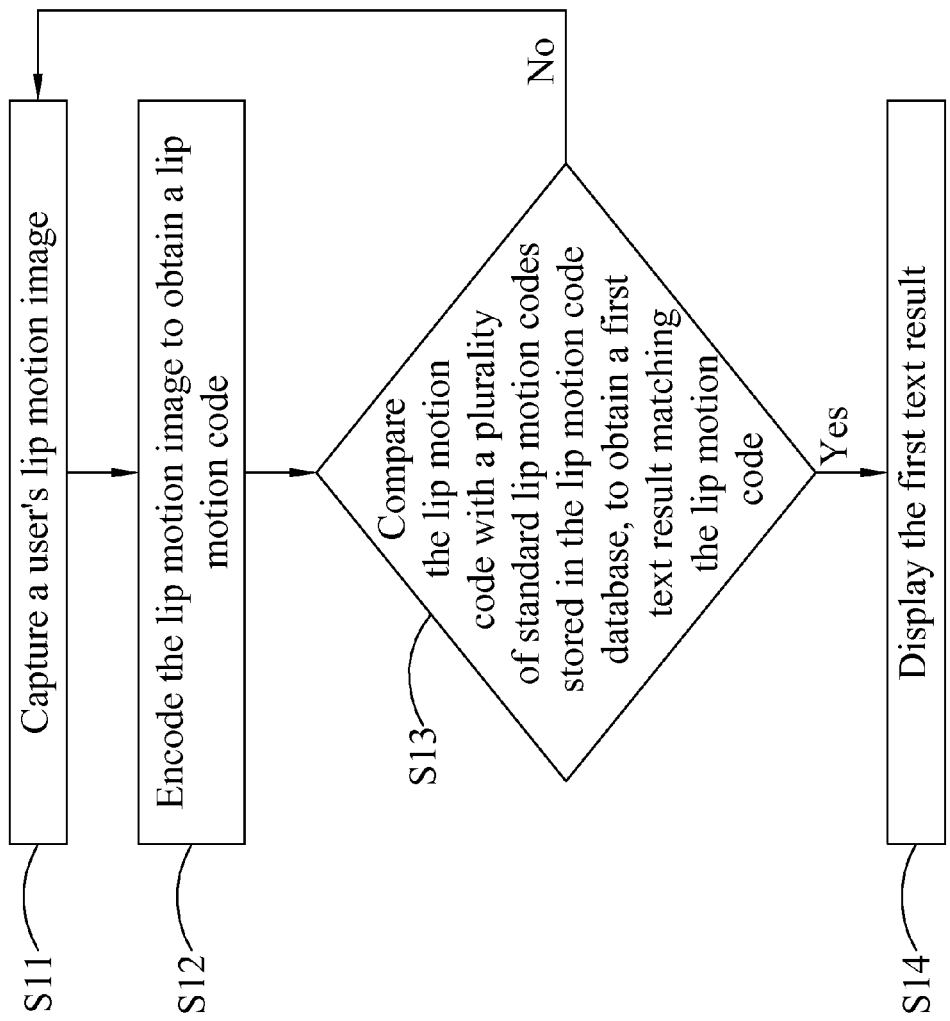
FIG. 4 is a flow chart of a input method in accordance with a first preferred embodiment of the present invention.

With reference to FIG. 4 for a flow chart of an input method in accordance with a first preferred embodiment of the present invention, the input method comprises the following steps. Step S11: Capture a user's lip motion image. Step S12: Encode the lip motion image to obtain a lip motion code. Step S13: Compare the lip motion code with a plurality of standard lip motion codes stored in the lip motion code database, to obtain a first text result matching the lip motion code. If the comparison matches, then a first text result matching the lip motion code is obtained. Step S14: Display the first text result. Return to step S11 if the first text result matching the lip motion code is not obtained in step S13 after the lip motion code is compared and analyzed, and the image capturing unit 11 will capture another user's lip motion image. The steps S12 to step S13 are repeated until a first text result is recognized, and then the first text result is displayed as described in step S14.

In an embodiment, the image capturing unit 11 captures a user's lip motion image in step S11, and the processing module 12 receives and transmits the lip motion image captured in step S11 as described in step S12. The lip-reading analyzing unit 122 encodes the lip motion image to obtain the lip motion code. After the lip motion code corresponding to the lip motion image is obtained as described in step S12, the processing module 12 further compares and analyzes the lip motion code with the plurality of standard lip motion codes stored in the lip motion code database 121 to recognize whether the first text result matching the lip motion code is obtained.

In step S13, if the first text result matching the lip motion code is obtained, the method will enter step S14, and the processing module 12 transmits the first text result to the display unit 14, and the display unit 14 outputs and displays the first text result on the screen. In step S13, if the comparison fails, then the electronic device of this preferred embodiment will notice the user to input another lip motion image for recognition. Step S11 is returned to capture another lip motion image after the comparison fails, and steps S12 and S13 are repeated to perform the recognition and comparison again as shown in FIG. 4.

If the first text result matching the lip motion code is not obtained in step S13 after the recognition and comparison, the method may return to step S11 to allow the user to input another lip motion image and perform a comparison again, and further enter an auxiliary analyzing mode for the electronic device. In an embodiment, the auxiliary analyzing mode may be set as a facial expression analyzing mode for recognizing a facial expression to be inputted, a hand gesture analyzing mode for recognizing a hand gesture to be inputted, or an audio analyzing mode for recognizing an audio signal to be inputted. After the electronic device is under an auxiliary analyzing mode, the user's facial expression image, hand gesture image or audio signal/message can be used to assist in analyzing and recognizing the lip motion image.

Figure 5:
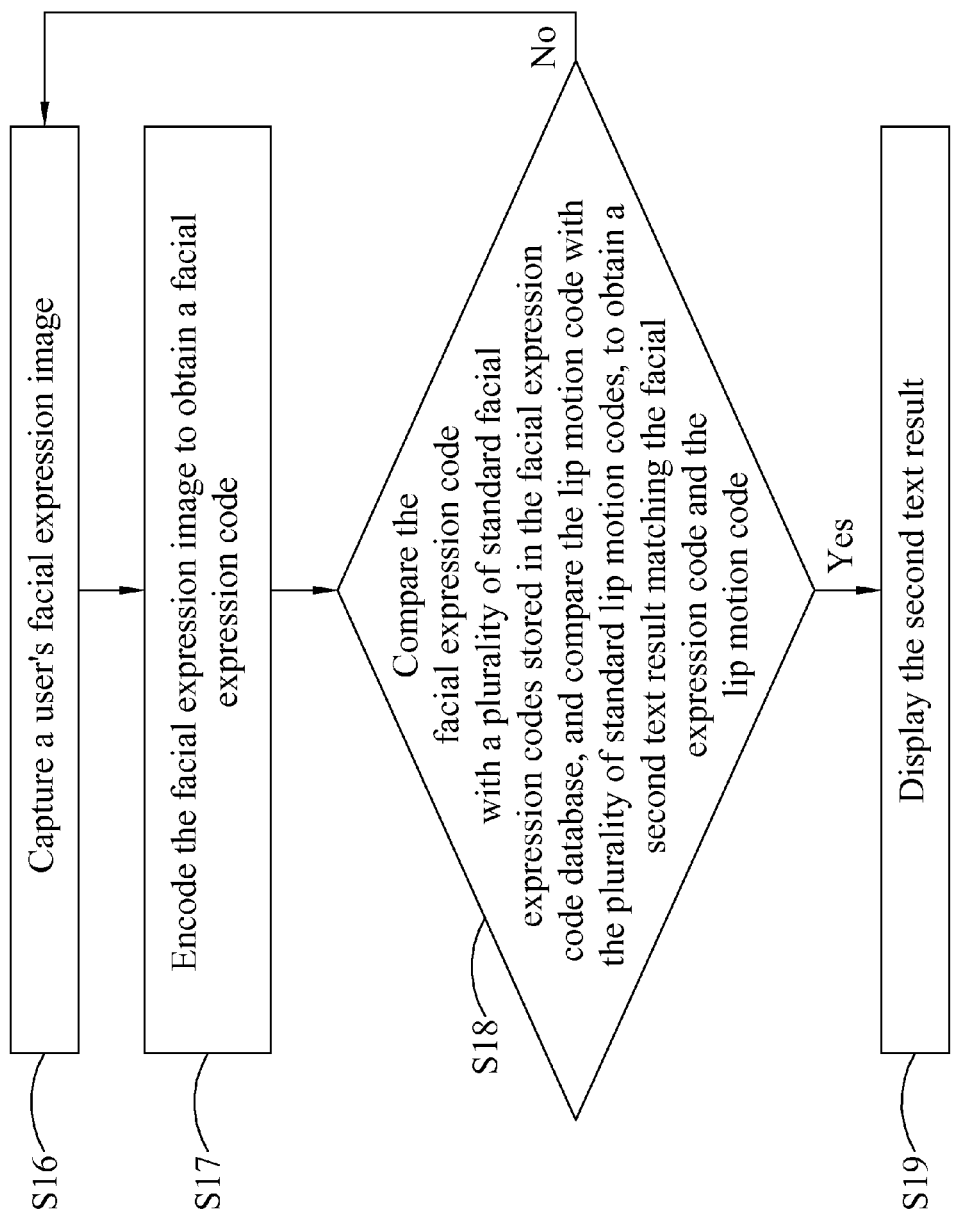
FIG. 5 is a flow chart of a input method in accordance with a second preferred embodiment of the present invention.

With reference to FIG. 5 for a flow chart of an input method in accordance with a second preferred embodiment of the present invention, if a first text result matching the lip motion code cannot be obtained in the process of comparing and analyzing the lip motion code in step S13, then the auxiliary analyzing mode, which is the facial expression analyzing mode, will be enabled. In FIG. 5, when the electronic device enters an auxiliary analyzing mode, which is set as the facial expression analyzing mode, the input method further comprises the following steps. Step S16: Capture a user's facial expression image. Step S17: Encode the facial expression image to obtain a facial expression code. Step S18: Compare the facial expression code with a plurality of standard facial expression codes stored in the facial expression code database, and compare the lip motion code with the plurality of standard lip motion codes, to obtain a second text result matching the facial expression code and the lip motion code.

In an embodiment, the image capturing unit 11 captures the user's facial expression image in step S16. The processing module 12 receives the facial expression image captured in step S17. The facial expression analyzing unit 124 encodes the facial expression image to obtain the facial expression code. After the facial expression code is obtained in step S18, the processing module 12 further compares and analyzes the facial expression code with a plurality of standard facial expression codes stored in the facial expression code database 123. In the meantime, the lip motion code is compared with the plurality of standard lip motion codes to recognize whether or not the second text result matching the facial expression code and the lip motion code is obtained.

In step S18, if the second text result matching the lip motion code and the facial expression code is obtained, the method will enter step S19 to display the second text result. On the other hand, if the second text result matching the lip motion code and the facial expression code is not obtained, the method will return to step S16 to capture another facial expression image of the user and repeat steps S17 to S18. If the second text result is still not obtained, the method will continue repeating steps S16 to S18 until the second text result is obtained.

Figure 6:
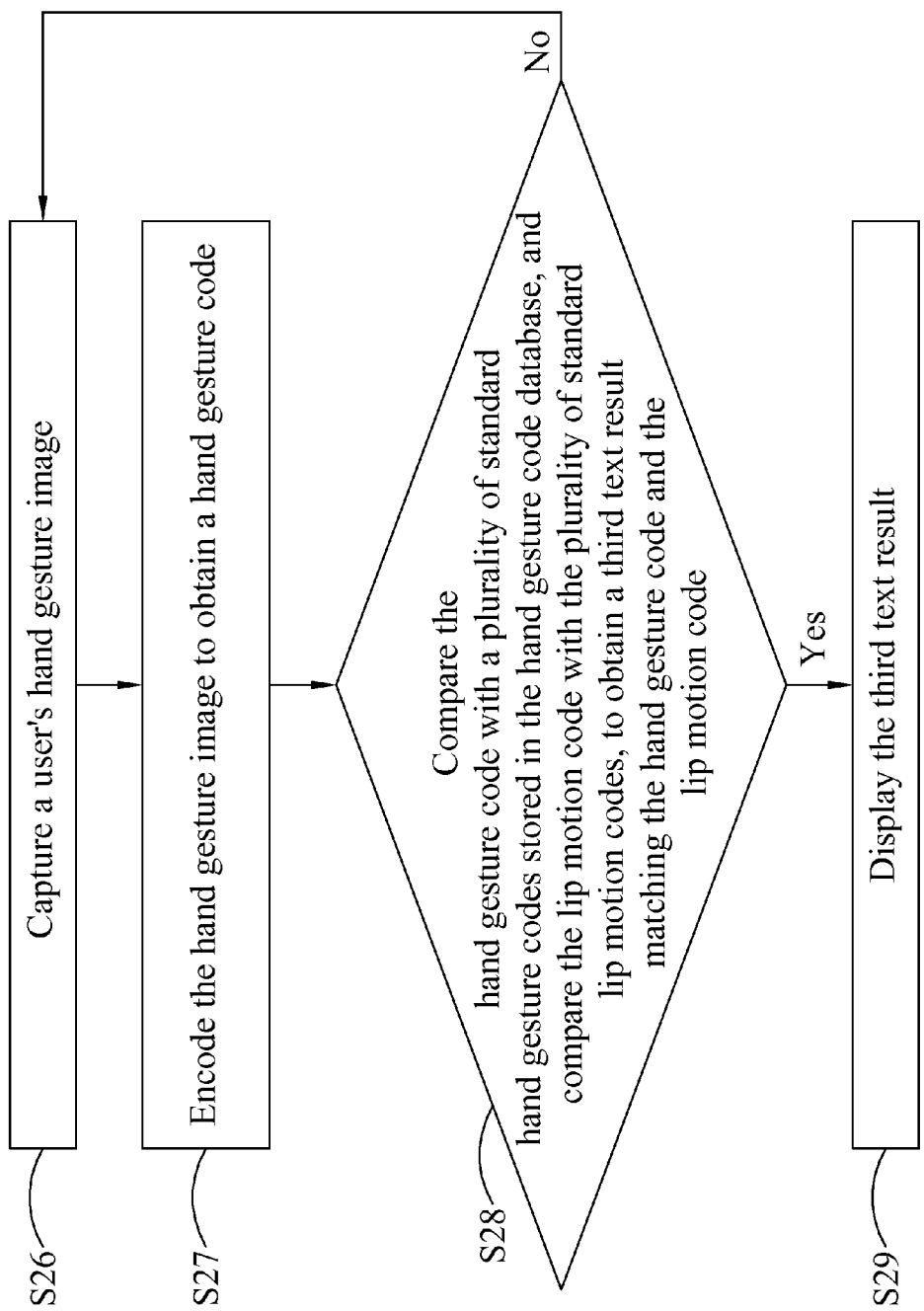
FIG. 6 is a flow chart of a input method in accordance with a third preferred embodiment of the present invention.

After the auxiliary analyzing mode is enabled, the auxiliary analyzing mode can be set to the hand gesture analyzing mode. With reference to FIG. 6 for a flow chart of an input method in accordance with a third preferred embodiment of the present invention, the auxiliary analyzing mode is set to the hand gesture analyzing mode. The input method further comprises the following steps. Step S26: Capture a user's hand gesture image. Step S27: Encode the hand gesture image to obtain a hand gesture code. Step S28: Compare the hand gesture code with a plurality of standard hand gesture codes stored in the hand gesture code database, and compare the lip motion code with the plurality of standard lip motion codes, to obtain a third text result matching the hand gesture code and the lip motion code.

In an embodiment, the image capturing unit 11 captures a user's hand gesture image in step S26, and the processing module 12 receives the hand gesture image captured in step 26 and transmits the hand gesture image to the hand gesture analyzing unit 126 for encoding the hand gesture image in step S27 to obtain the hand gesture code. After the hand gesture code is obtained, the processing module 12 as described in step S28 further compares and analyzes the hand gesture code with a plurality of standard hand gesture codes stored in the hand gesture code database 125. In the meantime, the lip motion code is compared with a plurality of standard lip motion codes to recognize whether or not the third text result matching the hand gesture code and the lip motion code is obtained.

In step S28, if the third text result matching the lip motion code and the hand gesture code is obtained, the method will enter step S29 to display the third text result. On the other hand, if the third text result matching the lip motion code and the hand gesture code is not obtained, the method will return to step S26 to capture a user's hand gesture image, and repeat steps S27 to S28. If the third text result is still not obtained, the method will repeat steps S26 to S28 until the third text result is obtained.

Figure 7:
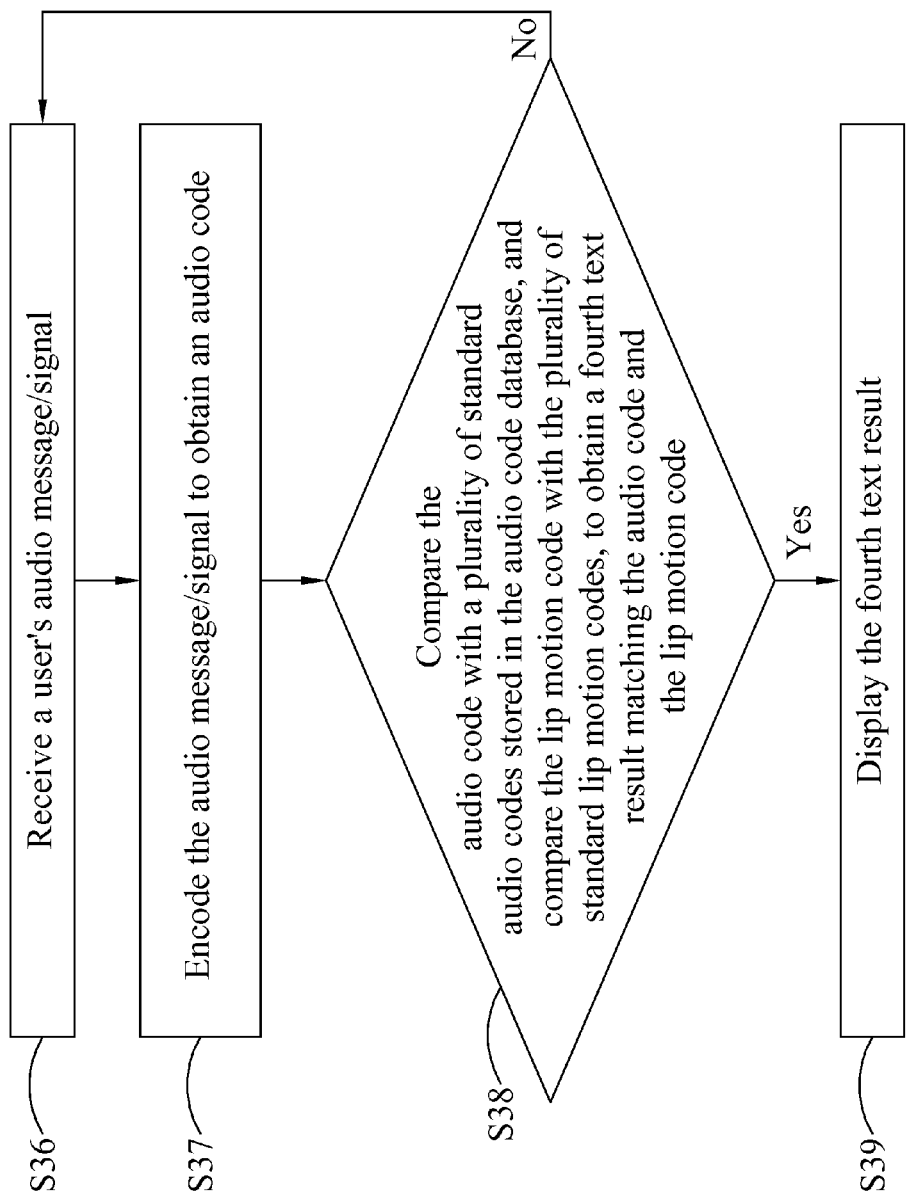
FIG. 7 is a flow chart of a input method in accordance with a fourth preferred embodiment of the present invention.

After the auxiliary analyzing mode is enabled, the auxiliary analyzing mode is set to the audio analyzing mode. With reference to FIG. 7 for a flow chart of an input method in accordance with a fourth preferred embodiment of the present invention, the auxiliary analyzing mode is set to the audio analyzing mode. The input method comprises the following steps. Step S36: Receive a user's audio message/signal. Step S37: Encode the audio message/signal to obtain an audio code. Step S38: Compare the audio code with a plurality of standard audio codes stored in the audio code database, and compare the lip motion code with the plurality of standard lip motion codes, to obtain a fourth text result matching the audio code and the lip motion code.

In an embodiment, the audio input unit 3 is provided for a user to input an audio message/signal and receive the audio message/signal in step S36. The processing module 12 receives the audio message/signal received in step S36 and transmits the audio message/signal to the audio analyzing unit 128 for encoding the audio message/signal in step S37 to obtain an audio code. In step S38, the processing module 12 further compares and analyzes the audio code and the plurality of standard audio codes stored in the audio code database 127. In the meantime, the lip motion code is compared with a plurality of standard lip motion codes to see whether there is a fourth text result matching the audio code and the lip motion code.

In step S38, if a fourth text result matching the lip motion code and the audio code, the method will enter step S39 to display the fourth text result. On the other hand, if the fourth text result matching the lip motion code and the audio code is not obtained, the method will return to step S36 and the user can input another audio message/signal again, and repeat steps S37 to S38. If the further text result is still not obtained, the method continues repeating steps S36 to S38 until the fourth text result is obtained.

Figure 8:
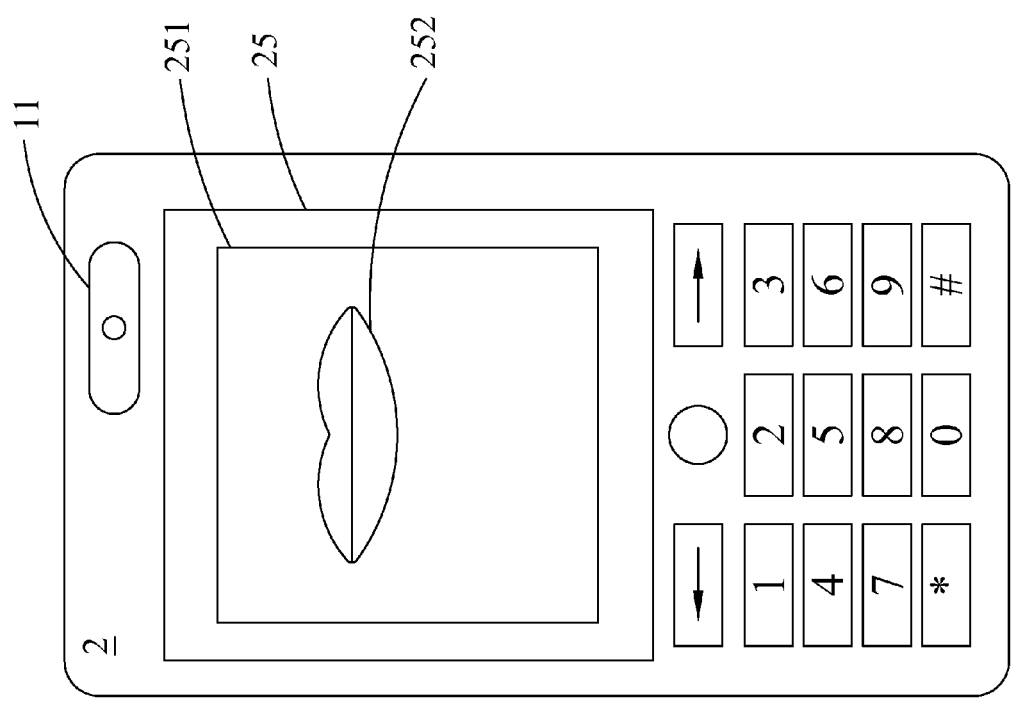
FIG. 8 shows a display interface of an electronic device used in a preferred embodiment of the present invention.
Figure 9:
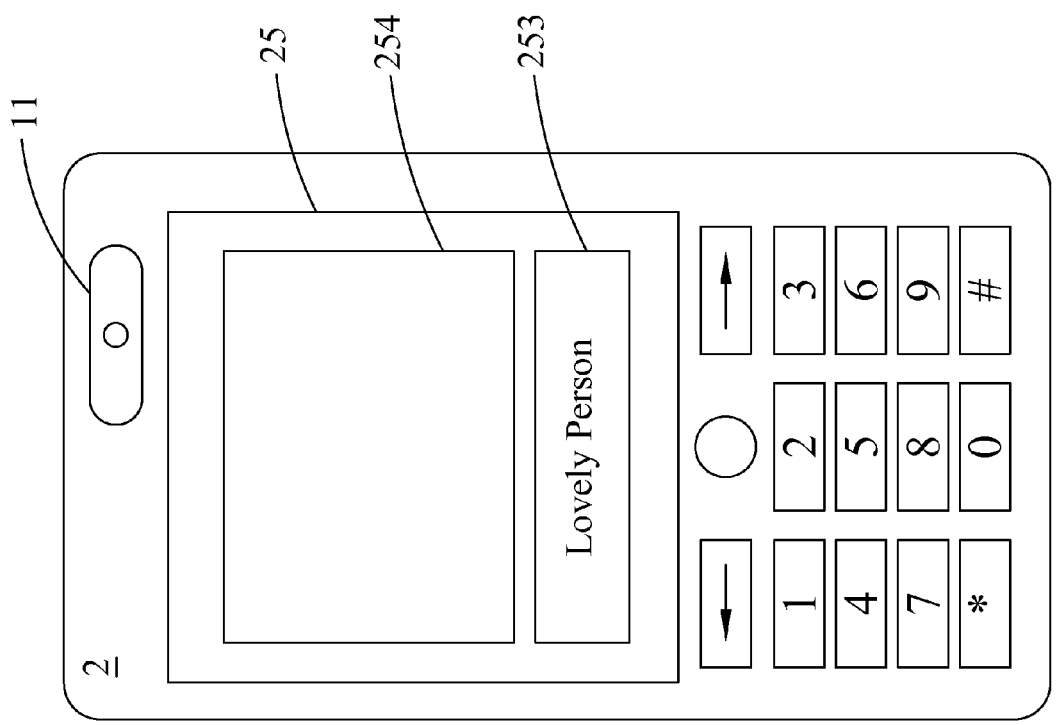
FIG. 9 shows a display interface of an electronic device used in a preferred embodiment of the present invention.
Figure 10:
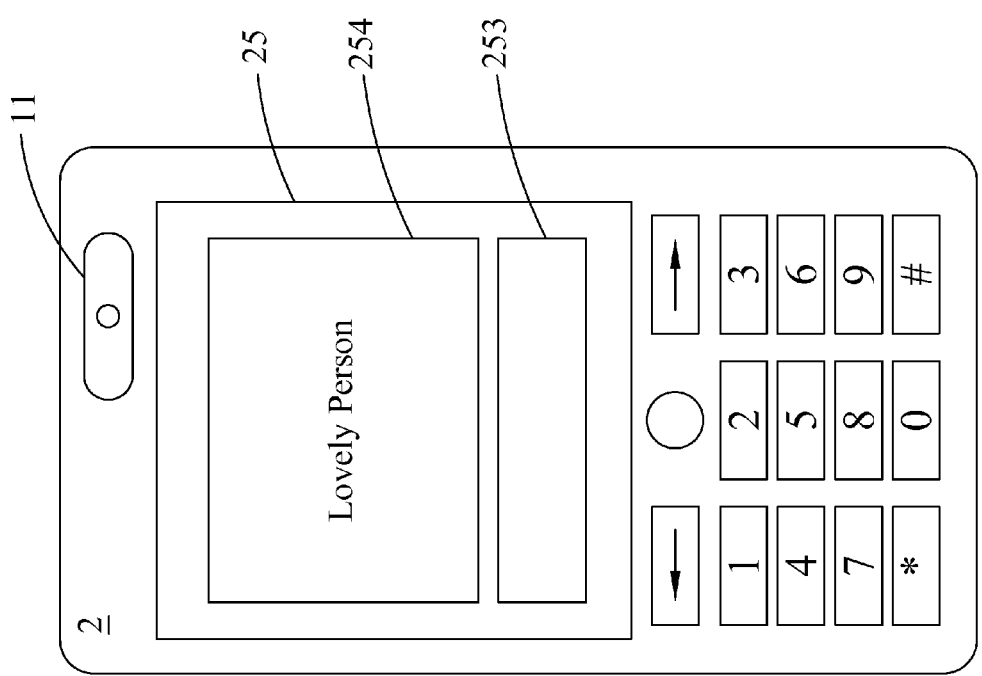
FIG. 10 shows a display interface of an electronic device used in a preferred embodiment of the present invention.
Figure 11:
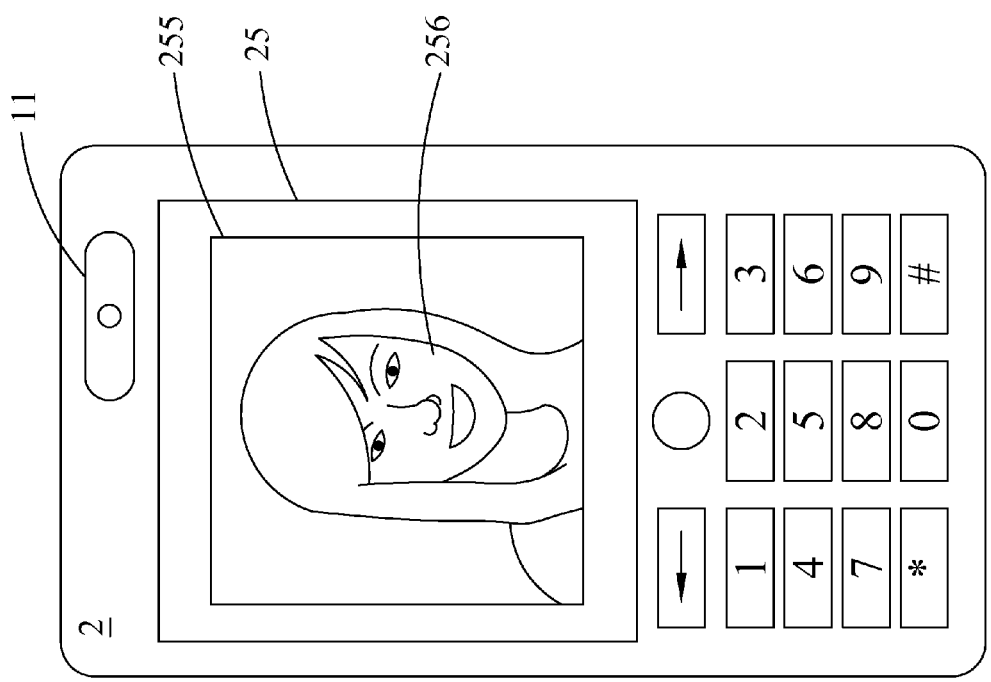
FIG. 11 shows a display interface of an electronic device used in a preferred embodiment of the present invention.

With reference to FIG. 8 for a display interface of an electronic device used in a preferred embodiment of the present invention, the electronic device of the present invention is applied to a mobile phone 2. In FIG. 8, if a user sends a short message by the mobile phone, the user may align a lip-reading frame 251 on the mobile phone display interface 25 to read the desired input text information such as "Lovely Person". Now, the image capturing unit 11 of the mobile phone reads a lip motion image 252 of the text information "Lovely Person" and analyzes the lip motion image 252. After the recognition, if a first text result "Lovely Person" is obtained, the first text result will be displayed on the text input frame 253. With reference FIG. 9 for a display interface of an electronic device used in a preferred embodiment of the present invention, if the text is correct, the user can confirm the text by pressing an Enter key and input this text result into a short message text frame 254. With reference to FIG. 10 for a display interface of an electronic device used in a preferred embodiment of the present invention, if the corresponding text result cannot be obtained, the input mode will enter the auxiliary analyzing mode. The facial expression analyzing mode, the hand gesture analyzing mode or an audio analyzing mode are set for an auxiliary analysis. If the facial expression analyzing mode is set, the display interface 25 of the mobile phone will show a facial expression frame 255, and the image capturing unit 11 will capture the user's facial expression image 256. With reference to FIG. 11 for a display interface of an electronic device used in a preferred embodiment of the present invention, if the second text result such as "Lovely Person" is obtained after the analysis and recognition take place, the second text result will be displayed on the text input frame 253. Now, if the text is correct, the user can confirm the text by pressing the Enter key, and input the text result in the short message text frame 254. In FIG. 10, if the text is incorrect, the user can input another facial expression image or return to the previous step to input another lip motion image, and repeat the analysis and recognition.

In summary of the description above, the user can use the electronic device and the input method of the present invention to input the user's lip motion image, facial expression image, hand gesture image or audio message/signal to achieve the effect of inputting the text information into an electronic information device, and improving the convenience of inputting text information, while achieving the recreation effect.

Obviously, the invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. An input method applicable for inputting into an electronic device having an image capturing unit, a processing module, a lip-reading analyzing unit, a lip motion code database, a display module, a facial expression analyzing unit and a facial expression code database, and the input method comprising the steps of:

capturing a lip motion of a person through the image capturing unit;

receiving an image of the lip motion from the image capturing unit;

encoding the lip motion image through the lip-reading analyzing unit to obtain a lip motion code;

the processing module comparing the lip motion code with a plurality of standard lip motion codes stored in the lip motion code database, to obtain a first text result matching the lip motion code;

displaying the first text result through the display module if the first text result is obtained;

activating an auxiliary analyzing mode, if the first text result is not obtained, wherein the auxiliary analyzing mode is a facial expression analyzing mode;

capturing a facial expression of the person through the image capturing unit;

receiving an image of the facial expression from the image capturing unit;

encoding the facial expression image through the facial expression analyzing unit to obtain a facial expression code;

the processing module comparing the facial expression code with a plurality of standard facial expression codes stored in the facial expression code database, and comparing the lip motion code with the plurality of standard lip motion codes, to obtain a second text result matching the facial expression code and the lip motion code; and displaying the second text result through the display module if the second text result is obtained.

2. The input method of claim 1, wherein the lip motion code comprises a coordinate value of each lip motion characteristic point in the lip motion image, and the coordinate value is in a Cartesian coordinate system and calculated by the lip-reading analyzing unit.

3. The input method of claim 1, wherein the step of encoding the lip motion image comprises or follows recognizing the lip motion from the lip motion image.

4. The input method of claim 1, returning to the step of capturing a lip motion through the image capturing unit for capturing another lip motion image input by the person, if the first text result is not obtained.

5. The input method of claim 1, wherein the auxiliary analyzing mode comprises a facial expression analyzing mode, a hand gesture analyzing mode, or an audio analyzing mode.

6. The input method of claim 1, wherein the facial expression code comprises a coordinate value of each facial expression characteristic point in the facial expression image, and the coordinate value is in a Cartesian coordinate system and calculated by the facial expression analyzing unit.

7. The input method of claim 1, wherein the step of encoding the facial expression image comprises or follows recognizing the facial expression from the facial expression image.

8. The input method of claim 1, wherein the electronic device further comprises a hand gesture analyzing unit and a hand gesture code database, the auxiliary analyzing mode is a hand gesture analyzing mode, and the input method further comprises the steps of:

capturing a hand gesture of the person by the image capturing unit;

receiving an image of the hand gesture from the image capturing unit;

encoding the hand gesture image through the hand gesture analyzing unit to obtain a hand gesture code;

the processing module comparing the hand gesture code with a plurality of standard hand gesture codes stored in the hand gesture code database, and comparing the lip motion code with the plurality of standard lip motion codes, to obtain a third text result matching the hand gesture code and the lip motion code; and displaying the third text result through the display module if the third text result is obtained.

9. The input method of claim 8, wherein the step of encoding the hand gesture image comprises or follows recognizing the hand gesture from the hand gesture image.

10. The input method of claim 1, wherein the electronic device further includes an audio analyzing unit, an audio input unit, and an audio code database, the auxiliary analyzing mode is an audio analyzing mode, and the input method further comprises the steps of:

receiving an audio signal from the audio input unit, the audio signal being input by the person into the audio input unit;

encoding the received audio signal through the audio analyzing unit to obtain an audio code;

the processing module comparing the audio code with a plurality of standard audio codes stored in the audio code database, and comparing the lip motion code with the plurality of standard lip motion codes, to obtain a fourth text result matching the audio code and the lip motion code; and displaying the fourth text result through the display module if the fourth text result is obtained.

11. The input method of claim 10, wherein the step of encoding the received audio signal comprises or follows recognizing an audio message from the received audio signal.

12. The input method of claim 1, wherein the lip motion code database is configured to store the plurality of standard lip motion codes for languages of different countries, and provides for setting one of the languages as a default language to be used on the electronic device.

* * * * *